United States Patent [19]

Kiryu

[11] 4,430,290
[45] Feb. 7, 1984

[54] PLASMA CONFINING DEVICE

[76] Inventor: Yuichi Kiryu, 1-12-9, Naka-Cho, Koganei-Shi, Tokyo-To, Japan

[21] Appl. No.: 317,639

[22] Filed: Nov. 2, 1981

Related U.S. Application Data

[63] Continuation of Ser. No. 63,318, Aug. 2, 1979, abandoned.

[30] Foreign Application Priority Data

Aug. 25, 1978 [JP] Japan ................. 53-103629

[51] Int. Cl.³ .............................................. G21B 1/00
[52] U.S. Cl. ................... 376/134; 376/137; 376/140; 376/107
[58] Field of Search ............... 376/140, 142, 107, 121, 376/137, 134

[56] References Cited

U.S. PATENT DOCUMENTS

| | | | |
|---|---|---|---|
| 3,125,492 | 3/1964 | Baker | 376/140 |
| 3,141,826 | 7/1964 | Friedrichs et al. | 376/140 |
| 3,194,739 | 7/1965 | Kerst et al. | 376/137 |
| 3,230,418 | 1/1966 | Dandl et al. | 376/140 |
| 3,491,318 | 1/1970 | Henning et al. | 376/142 |
| 3,523,209 | 8/1970 | Ohkawa et al. | 376/121 |
| 4,125,431 | 11/1978 | Fowler | 376/140 |
| 4,127,442 | 11/1978 | Logan | 376/140 |
| 4,166,760 | 9/1979 | Fowler et al. | 376/140 |
| 4,189,346 | 2/1980 | Jarnagin | 376/107 |
| 4,202,725 | 5/1980 | Jarnagin | 376/140 |

*Primary Examiner*—Sal Cangialosi
*Attorney, Agent, or Firm*—Ladas & Parry

[57] ABSTRACT

A plasma confining device is provided with a deflection magnetic field device which sets magnetic flux perpendicularly to a central plane of sheet-shaped charged particle flow formed by charged particles which have escaped from a plasma confined by a cusp magnetic field or a mirror magnetic field through the line cusp or linear open end thereof, an edge of the deflection magnetic field being perpendicular to the direction of motion of the sheet-shaped charged particle flow, so that each charged particle, composing the sheet-shaped charged particle flow, is changed in its direction of motion reversely and forced to reenter into the plasma without remarkable loss.

1 Claim, 15 Drawing Figures

PLASMA CONFINING DEVICE

This is a continuation of application Ser. No. 063,318 filed Aug. 2, 1979, now abandoned.

BACKGROUND AND SUMMARY OF THE INVENTION

This invention relates to plasma confining devices intended to generate a thermonuclear reaction, and more particularly to a plasma confining device which is additionally applied to a cusp magnetic field and a mirror magnetic field with linear open ends which are used in plasma confinement system with magnetic field.

An object of this invention is to provide a plasma confining device in which, with respect to a plasma confinement system of open end type in which the particle loss is great essentially, the particle loss and accordingly the energy loss are reduced, whereby the plasma confining performance is remarkably improved.

The foregoing object and other objects of the invention will become more apparent from the following description and the appended claim when read in conjunction with the accompanying drawings.

DETAILED DESCRIPTION OF THE INVENTION

As conducive to a full understanding of this invention, first a cusp magnetic field and its plasma confining function will be described. The term "particle" as used herein is intended to mean a charged particle, unless otherwise specified.

Figure 1:
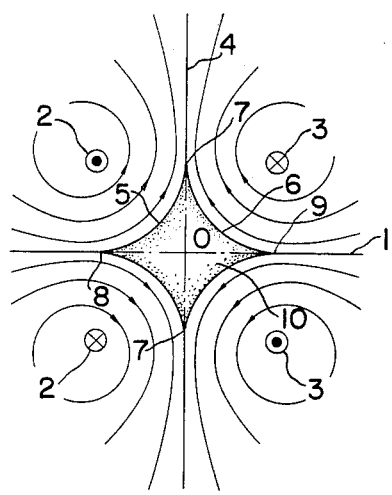
FIG. 1 is a sectional view showing a biconical cusp magnetic field and a plasma confined therein.

FIG. 1 is a sectional view showing the fundamental shape of cusp magnetic field. As shown in FIG. 1, two equal circular coils 2 and 3 are disposed in parallel, with a central line 1 as their common axis, and these adjacent parallel coils carry equal currents as indicated by the current symbols in the figure. Magnetic flux is created as indicated by the thin arrows by the magnetomotive forces of the two circular coils 2 and 3. The magnetic flux thus created is of a so-called "absolute minimum B" type arrangement in which the magnetic field strength is zero at the center O thereof and is greater towards the outside. The magnetic flux is arranged radially from the central point O in the central plane 4 between the circular coils 2 and 3.

It is assumed that plasma is generated in this magnetic field. In this case, the plasma is confined in a region 10 which is surrounded by curved surfaces 5 and 6 at which the internal pressure of the plasma is balanced with the magnetic pressure of the magnetic field. The curved surfaces 5 and 6 form circular line cusps 7 in the central plane 4 and point cusps 8 and 9 on the central line 1. Therefore, the magnetic field in this shape is called as "a cusp magnetic field." There are various configurations of cusp magnetic field. However, the description will be made with reference to a circular cusp magnetic field as shown in FIG. 1.

Figure 2:
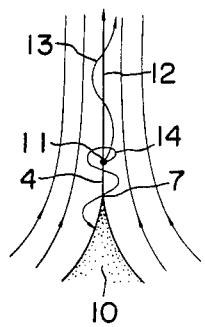
FIG. 2 is a sectional view of a part of a line cusp for a description of a mechanism in which a charged particle escapes from a line cusp.
Figure 3:
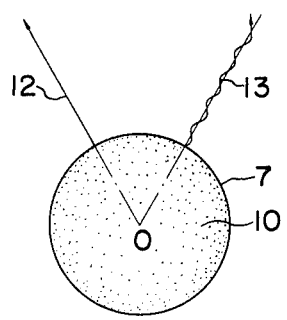
FIG. 3 is a sectional view taken along a plane including the line cusp in a cusp magnetic field shown in FIG. 1.

The cusp magnetic field is of the "absolute minimum B" type. Therefore, it is advantageous in that it is essentially excellent in MHD stability and the plasma density can readily obtain a high $\beta$ value. On the other hand, the cusp magnetic field is of one open end system, and therefore a large amount of particle loss is caused through the line cusp and point cusp which are the open ends thereof. This particle loss is called as "cusp loss." In this connection, a mechanism causing the cusp loss will be described with reference to FIG. 2, which is an enlarged view of the vicinity of the line cusp 7. It is assumed that a particle, leaving the plasma region 10 along the line cusp 7, is at the position 11 in FIG. 2. Let's consider a first case where the particle is left from the plasma region by advancing perfectly in parallel with the magnetic flux. In this case, the electromagnetic action between the motion of the particle and the magnetic flux is not effected at all, and therefore the particle is moved along the orbit 12 thus leaving the plasma region 10. Furthermore, let's consider a second case where the motion of the particle is not completely in parallel with the magnetic flux, and its velocity component perpendicular to the magnetic flux is sufficiently smaller that the velocity component in parallel with the magnetic flux. In this case, the particle moves away from the plasma region 10 by going along a spiral orbit, as indicated by 13. In addition, let's consider a third case where the particle has the velocity component perpendicular to the magnetic flux which is sufficiently larger than the velocity component in parallel with the magnetic flux. In this case, the density of the magnetic flux encountered by the particle is increased as the particle is advanced, and therefore when the particle moves to a certain position, it is pushed back by the magnetic field and it is moved along an orbit 14, thus being returned inside of the plasma region 10. These cases will be described with reference to FIG. 3 which is a sectional view taken along the central plane 4 of the cusp magnetic field. The orbit 12 in the first case is coincident with a radius extended from the central point O, and the guiding center line of the spiral orbit 13 is also coincident with a radius extended from the central point O.

The above-described cusp loss is caused in the first and second cases. In the cusp magnetic field, the magnetic field strength is zero at the central point O, and therefore the magnetic moment diabatic invariability of particles is not established. Accordingly, the particles can have an elimination condition with probability higher than that in a mirror magnetic field, and therefore the cusp loss in the cusp magnetic field is considerably great. The cusp loss can be somewhat reduced by increasing the magnetic field strength or enlarging the scale of the device; however, such treatment is still insufficient. Accordingly, the present evaluation on the cusp magnetic field in the fundamental form is pessimistic that it could realize critical condition of thermonuclear reaction. In order to suppress the cusp loss, a cusp high frequency hybrid confinement system has been provided in which high frequency electric field close to the ion cyclotron frequency is applied to the vicinity of the line cusp and the point cusp. The experimental results of this system are hopeful one. In addition, the system is considerably effective to particles whose energy is relatively low. However, the system is not effective to a high energy particle which, having a large amount of motion, can pass through the high frequency electric field region in an extremely short period of time. The high energy particle is low in relative existence probability, but carries a relatively larger part of the entire plasma energy. Therefore, if a method of effectively stopping the escape of the high energy particle is not provided, the confined plasma loses the energy abruptly, as a result of which it becomes difficult to sustain the nuclear reaction.

As the method of effectively stopping the escape of the high energy particle has not been provided yet, the problem must be solved by other methods. The invention is intended to offer a solution. The principle of the invention is as follows: That is, a plasma confining device according to the invention is so designed that a deflecting magnetic field is provided so as to intercept a particle escaped from the line cusp, and the particle is advanced in the opposite direction in the deflecting magnetic field so that the particle is returned from the line cusp to the plasma region. Because of this functional principle, the energy loss caused during the period of time of from the escape of the particle from the line cusp to the return to the plasma region is due to scattering and radiation, thus being limited, as a whole, to a small value. Accordingly, with the plasma confining device according to the invention, the cusp loss in the line cusp of the cusp magnetic field does not directly relate to the particle loss, and accordingly the particle loss and the energy loss can be markedly reduced. The principle of this invention can be applied to the linear open ends of a mirror magnetic field; however, it cannot be applied to the point cusps of a cusp magnetic field without modification.

The concrete object and the applicaton limit of this invention are as roughly described above. Now, the embodiments of the invention and their operating principles will be described in detail.

Figure 4:
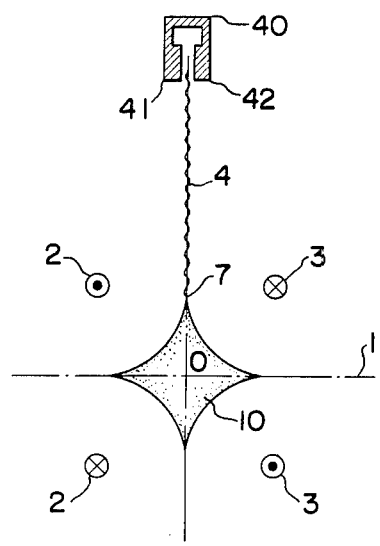
FIG. 4 is a part of a sectional view showing one embodiment of this invention which is applied to a biconical cusp magnetic field.
Figure 5:
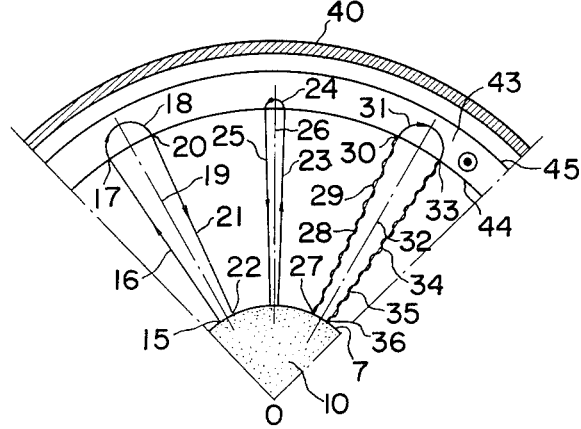
FIG. 5 is a part of a sectional view taken along a plane including a line cusp in FIG. 4.

First, the most fundamental embodiment of the invention will be described. FIGS. 4 and 5 illustrate the plasma confining device according to the invention, which is applied to the biconical cusp magnetic field shown in FIGS. 1 and 3. The particles escaped from the line cusp 7 form a sheet-shaped plasma including the central plane 4. A magnet 40 is disposed in such a manner that the sheet-shaped plasma is between the magnetic poles 41 and 42 and that a magnetic field 43 is formed perpendicularly to the central plane 4 in the space between the magnetic poles. More specifically, the magnetic field is in the form of a ring having an edge 44 nearer to the plasma and an edge 45 farther from the plasma, and its magnetic flux density is equal at positions having the same distance (radius) from the central line 1 and has a constant or moderate magnetic potential gradient. It is assumed that one ion moves in a radial direction from the position 15 of the line cusp 7. This ion moves along a straight orbit 16 in the radial direction and reaches a position 17 on the magnetic edge 44. From this position 17, the ion moves along an orbit having a radius of curvature $R = mv/qB$ (where B is the magnetic flux density of the magnetic field 43, q is the electric charge of the particle, m is the mass of the particle, and v is the velocity of the particle) and reaches a position 20 on the magnetic field edge 44. In this case, because of the uniformity of the magnetic flux density, the orbit 18 is symmetrical with a radius 19 passing through a position at which the tangential direction is perpendicular to the radial direction. Accordingly, the ion passes through the position 20 symmetrical with the position 17 and moves in the radial direction towards the center O. More specifically, the ion moves along an orbit 21 symmetrical with the orbit 16 and enters the line cusp 7 at a position 22 symmetrical with the position 15. Thus, finally the ion is returned into the plasma region 10. In the case where the particle is an electron, the deflection direction in the magnetic field 43 is opposite to that in the above-described case. In other words, the electron moves along a straight orbit 23 in a radial direction, and moves along an orbit having a radius of curvature $R = mv/qB$ in the magnetic field 43. Thereafter, the electron moves along a straight orbit 25 in a radial direction towards the center O, and returns into the plasma region 10 through the line cusp 7. In this case, similarly as in the case of the ion, the orbits are also symmetrical with respect to a central line 26 of symmetry in a radial direction.

In the two examples described above, the orbits are in the central plane 4 for convenience in description. However, in the case of a particle having a velocity component perpendicular to the magnetic flux, the orbit must be expressed in three-dimension, because it makes spiral motion. Therefore, the following example will be described by projecting the orbit onto the central plane 4. It is assumed that the particle is an ion, the ion escapes from the line cusp 7 at a position 27, advances along a spiral orbit 29 with a guiding center 28, and enters the magnetic field 43 at a position 30 on the magnetic field edge 44 with an angle $\alpha'$. In this case, the ion moves along an orbit 31 having a radius of curvature $R = mv/qB$, and leaves, making an angle $-\alpha°$ with the radial direction, the magnetic field 43 at a position 33 symmetrical with the position 30 with respect to the central line 32 of symmetry in a radial direction which passes through the vertex of the orbit 31. Thereafter, the ion moves along a spiral orbit 35 having a guiding center 34, and enters the plasma region through the line cusp 7 at a position 36. In this case, the motion of the particle perpendicular to the central plane 4 in the magnetic field is not always symmetrical, and therefore the symmetry of the leaving and returning paths with respect to the central line 32 is not perfect.

The embodiment of the invention which is applied to the most fundamental biconical cusp magnetic field, and its functional principle have been described. The object of this device resides in that the magnetic flux is allowed to perpendicularly interlink the sheet plasma formed by the group of particles escaped from the line cusp, and the uniform magnetic field is generated so that its edges are perpendicular to the advancement direction of the particles. As the device has been arranged in this manner, the particle (which may be an ion or an electron) which has escaped from the plasma region through the line cusp is deflected by the electromotive force caused by the relative motion between the magnetic field and the particle, as a result of which the advancement direction of the particle is reversed, so that it is returned into the plasma region through the line cusp. In this case, the motion of the particle is similar to reflection motion, and therefore the magnetic field will be referred to as "a reflector magnetic field" hereinafter. A variety of plasma confining devices can be formed in accordance with the above-described fundamental operating principle, and a variety of cusp magnetic fields and mirror magnetic fields with linear open ends are available. Therefore, it is, or course, difficult to describe all of the combinations of them, and so typical examples of them will be described hereinafter.

First, some of the systems of generating the reflector magnetic field will be described.

Figure 6:
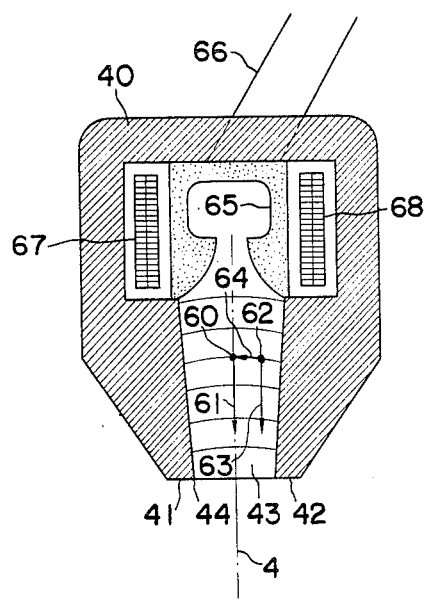
FIG. 6 is a sectional view showing another embodiment of the invention, in which a device according to the invention is formed with an iron core.

Similarly as in the device shown in FIGS. 4 and 5, one shown in FIG. 6 has a magnet with an iron core. However, the gap between the magnetic poles 41 and 42 of the magnet is getting wider towards the inside of the magnet 40 from its edge 44 nearer to the plasma. Accordingly, the magnetic flux density is larger at a position nearer to the plasma, that is, it decreases moderately as the position is moved inwardly of the magnet 40. In this case, the magnetic flux is in the form of arcs convex upwardly in the figure. This magnetic arrangement is used to improve the convergence of orbits in cyclotrons or synchrotrons. In the magnetic arrangement, only the electromagnetic deflection force 61 in the central plane 4 is applied to a particle 60 moving in the central plane; and a magnetic field component perpendicular to the central plane 4 applies an electromagnetic deflection force 63 in parallel with the central plane 4 to a particle 62 moving out of the central plane 4 and a magnetic field component in parallel with the central plane 4 applies a restoring force 64 perpendicular to the central plane 4 to the particle 62.

The magnetic field component in parallel with the central plane 4 is zero on the central plane 4 but it is increased as it moves away from the central plane 4. That is, advantageously, the magnetic field component in parallel with the central plane 4 has the convergence action that the particle out of the central plane 4 is moved back to the central plane 4. FIG. 6 shows essential elements for forming the reflector magnet, such as a neutral particle catcher 65 and its exhaust pipe 66, and exciting coils 67 and 68. However, instead of the exciting coils 67 and 68, a permanent magnet may be employed.

An example of the dimensions of such a reflector magnet is as follows: In the case of the average magnetic flux density $B = 1.0$ $Wb/m^2$, the radius of curvature R for a proton of 14.7 MeV is 0.54 m (R=0.54 m), and the radius of curvature R for an $\alpha$-particle of 11.2 MeV is 0.47 m (R=0.47 m). Thus, the depth of the magnetic field 43 may be of this order. With respect to the distance between the reflector magnetic field and the cusp magnetic field circular coils 2 and 3, if the magnetic field strength is of the order of 10 $Wb/m^2$ in the vicinity of the cusp the reflector magnetic field employing the iron core must be sufficiently remote from the coils so that the iron core is not magnetically saturated, and in practice it is necessary to select the radius of the reflector magnetic field to be five through seven times the radius of the cusp magnetic field coils.

Figure 7:
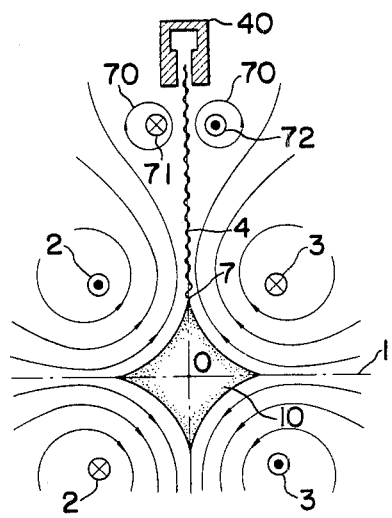
FIG. 7 is a sectional view showing another embodiment of the invention, in which coils for neutralizing the cusp magnetic field are additionally provided in the embodiment shown in FIG. 4.
Figure 8:
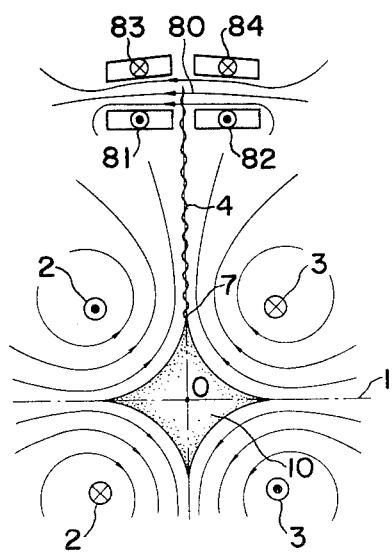
FIG. 8 is a sectional view showing another embodiment of the invention, in which the device according to the invention is formed without the iron core.

Reduction of the radius of the reflector magnetic field using the iron core can be accomplished by providing neutralizing coils 71 and 72 in the vicinity thereof as shown in FIG. 7. The coils 71 and 72 generate a neutralizing magnetic field 70 which will weaken the cusp magnetic field. In this case, the radius of the reflector magnetic field may be three or four times the radius of the cusp magnetic field coils. If this neutralizing magnetic field 70 is suitably set, then it may be employed as an element forming a diverter which catches and removes particles which are leaved away from the normal orbital plane, or it may serve to control the convergence of particles with respect to the central plane 4. In the above-described two examples, the reflector magnetic field is generated by using the magnet with the iron core. However, the reflector magnetic field can be generated by the use of a group of coils arranged as shown in FIG. 8 instead of the iron core. In this case (FIG. 8), electric currents are allowed to flow in the coils 81 and 82 in the same direction, while electric currents are allowed to flow in the coils 83 and 84 in a direction opposite to the aforementioned direction, so that the sum of the magnetomotive forces of these coils is substantially zero. If the coils are arranged in this manner, a reflector magnetic field 80 is generated in the space between the coils 81 and 82 and the coils 83 and 84, and the effect of the magnetic field is scarcely applied to the outside of the space. The space between the coils 81 and 82 is a path for particles, and the space between the coils 83 and 84 is a path for allowing neutral particles to escape.

Several methods of creating the reflector magnetic field have been described as above. Now, how to apply this invention to a variety of cusp magnetic fields and mirror magnetic fields with linear open ends will be described with reference to a typical example thereof. In this example, a magnet with an iron core is applied to generate a reflector magnetic field.

Figure 9:
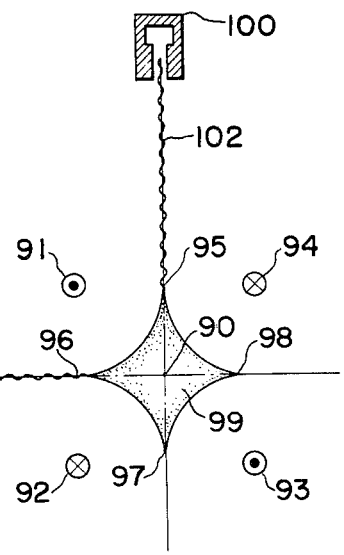
FIG. 9 is a part of a sectional view perpendicular to the center line, showing another embodiment of the invention which is applied to a linear cusp magnetic field.
Figure 10:
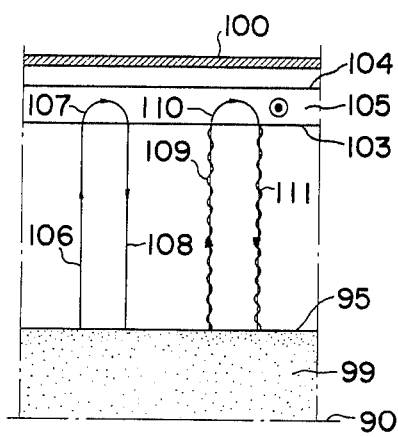
FIG. 10 is a part of a sectional view taken along a plane including a line cusp in FIG. 9.

FIG. 9 is a sectional view showing a linear cusp magnetic field which is formed continuously and perpendicularly to the suface of the drawing. The cusp magnetic field is formed by four cusp magnetic field coils 91, 92, 93 and 94, and in the cusp magnetic field thus formed a plasma region 99 with line cusps 95, 96, 97 and 98 is formed. Reflector magnets 100 and 101 are provided for reducing the cusp loss of the line cusps 95 and 96, and similar reflector magnets (not shown) are provided for the line cusps 97 and 98. FIG. 10 is a sectional view taken along a central plane 102 passing through the line cusp 95 and a central line 90. However, it should be noted that the following description can be applied to the central planes of the remaining three line cusps.

A reflector magnetic field 105 is generated between an edge 103, nearer to the plasma, of the reflector magnet 100 and an edge 104 remote from the plasma. A particle which has escaped in parallel with the magnetic flux from a plasma region 99 through the line cusp 95 is returned to the plasma region 99 through a straight orbit 106, a circular orbit 107 and a straight orbit 108 and through the line cusp 95 A particle having a velocity component perpendicular to the magnetic flux, which has escaped from the plasma region, is returned to the plasma region through a spiral orbit 109, a circular orbit 110 and a spiral orbit 111 and through the line cusp 92. As is apparent from the comparison of FIG. 5 with FIG. 10, with respect to a particle advancing in parallel with the magnetic field, in the case of circular cusp the inversion angle of the velocity vector of the particle in the reflector magnetic field is more than 180°, but in the case of a linear cusp it is just 180°, and the latter is the case where the advancement direction of particles is inverted.

Figure 11:
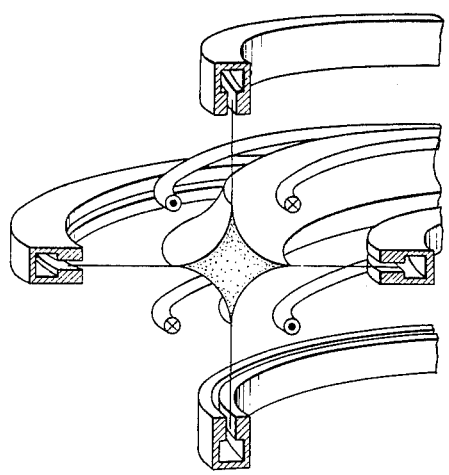
FIG. 11 is a part of a perspective view, with parts sectioned, showing another embodiment of the invention which is applied to the case where a linear cusp magnetic field is moderately curved.

FIG. 11 shows another embodiment of the invention provided for a cusp magnetic field different in shape. In this case, the cusp magnetic field is similar in section to that shown in FIG. 9; however, it is moderately curved thus forming a ring as shown in FIG. 11. If the curvature radius of the cusp is sufficiently larger than that of a particle in the reflector magnetic field, the cusp magnetic field may be considered approximately equivalent to the linear cusp shown in FIG. 9.

Figure 12:
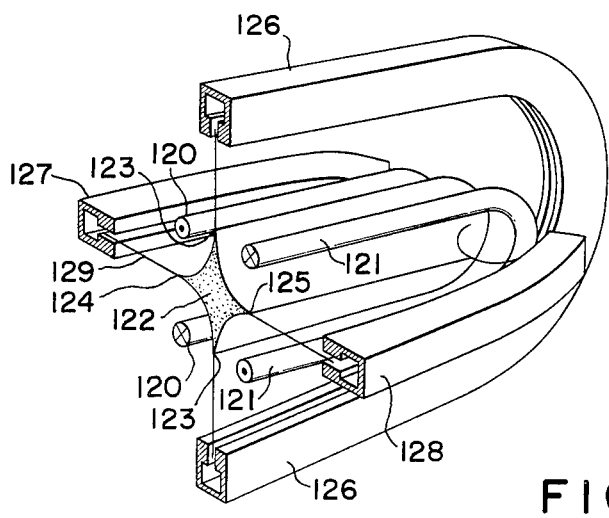
FIG. 12 is a part of a perspective view, with parts sectioned, showing another embodiment of the invention which is applied to the case where the length of a linear cusp magnetic field is limited.
Figure 13:
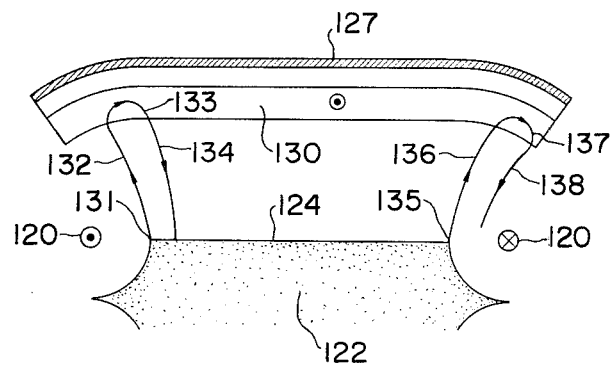
FIG. 13 is a part of a sectional view taken along a plane including a line cusp in FIG. 13.

FIG. 12 shows a further embodiment of the invention provided for a cusp magnetic field whose shape is different from those of the above-described cusp magnetic fields. This cusp magnetic field corresponds to the linear cusp shown in FIG. 9, the length of which is limited. In the embodiment shown in FIG. 12, coils 120 and 121 generate the cusp magnetic field, which in turn forms a plasma region 122 and its line cusps 123, 124 and 125. The relation between the line cusp 123 and a reflector magnet 126 will not be described, because it can be estimated from the above-described biconical cusp magnetic field and linear cusp magnetic field. However, the relation between the line cusp 124 and a reflector magnet 127 and the relation between the line cusp 125 and a reflector magnet 128 will be briefly described. FIG. 13 is a sectional view taken along a central plane 129 passing through the line cusp 124. Because of the configuration of the coil 120, with respect to the magnetic flux on the central plane 129, it is extended perpendicularly to the line cusp 124 but it is curved at both ends. To the end, the reflector magnetic field should be curved at both ends. A particle, or an ion, which has escaped through the left end 131 of the line cusp 124 moves along an orbit 132 and along a circular orbit 133 in the reflector magnetic field 130. Thereafter, the ion moves along an orbit 134 and enters the plasma region 122 through the line cusp 124. On the other hand, an ion which has escaped through the right end of the line cusp 124 moves along an orbit 136 and along a circular orbit 137 in the reflector magnetic field 130, and further moves along an orbit 138. However, as this orbit 138 is shifted right from the right end 135 of the line cusp 124, the particle cannot return to the plasma region 122, as a result of which particle loss is caused. The particle loss may be somewhat reduced by modifying the configuration of the reflector magnetic field; however, with the finite linear cusp, it is difficult to completely eliminate the particle loss at the two ends.

However, it should be noted that this particle loss is much less than the particle loss in the case where no reflector magnetic field is applied, and the use of the reflector field should be appreciated.

Figure 14:
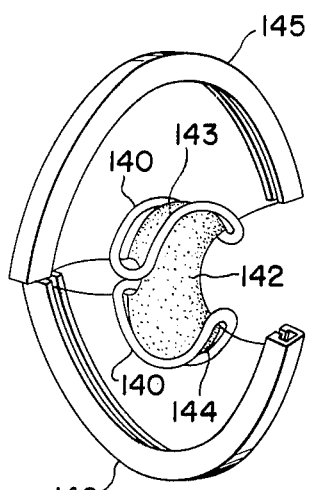
FIG. 14 is a perspective view showing another embodiment of the invention which is applied to a mirror magnetic field with linear open ends.

A typical one of embodiments of the invention which is applied to a mirror magnetic field having linear open ends will be described with respect to FIG. 14. In this case, the mirror magnetic field is generated by YEN-YAN coils 140 and 141. The cusp magnetic field is different in many respects from the mirror magnetic field; however, in the case of the mirror magnetic field shown in FIG. 14, the open ends 143 and 144 of a confined plasma region 142 is similar in shape to the finite line cusp. In the case of the line cusp, it is a line whose width is very small, while in the case of the mirror magnetic field it is a line having some width. The sheet plasma which flows out of the line is thicker than the sheet plasma which flows out of the line cusp; however, the former is similar in characteristic to the latter, and therefore it is possible to reduce the particle loss by the reflector magnetic field. Reflector magnets 145 and 146 are shaped as shown in FIG. 16, so that the magnetic field edges are perpendicular to the advancement direction of particles. In this case, similarly as in the case of the finite linear cusp, the particle loss is more or less caused at the two ends.

Figure 15:
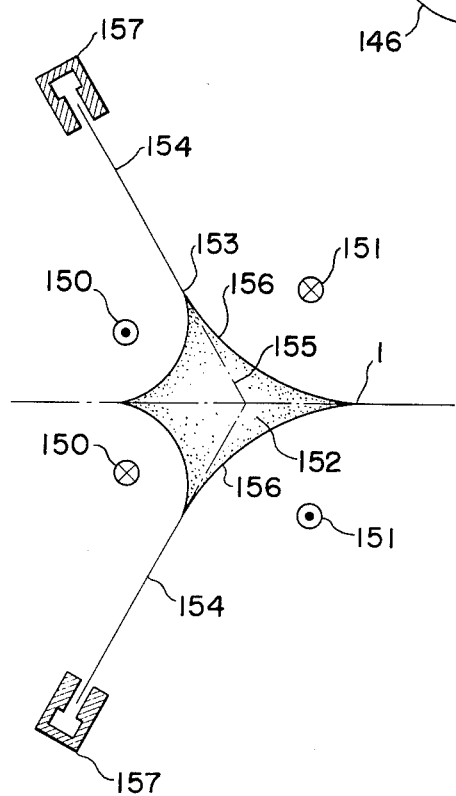
FIG. 15 is a sectional view showing the other embodiment of the invention which is applied to a biconical cusp magnetic field in which a sheet plasma forms a conical surface.

In each of the examples in FIGS. 4, 9, 12 and 14, the sheet plasma is flat, and in the example in FIG. 11 the sheet plasma is cylindrical. Finally, the case where the sheet plasma is conical. Shown in FIG. 15 is a kind of biconical cusp magnetic field which is generated by circular coils 150 and 151 arranged with the central line as the axis. A sheet plasma 154 flows out of a confined plasma region 152 through a line cusp 153. The sheet plasma 154 forms as its central surface a conical surface 156 including the line cusp 153 and having a point 155 on the central line 1 as its vertex. A reflector magnet 157 is disposed in such a manner that the sheet plasma is inserted therein. This arrangement is intended to prevent it from being repeated endlessly that a particle returned by being reflected by the reflector magnetic field passes through the plasma again to enter the opposite reflector magnetic field. In the case where an angle formed between the conical surface 155 and the radial direction is small, and in the case where the radius of the reflector magnetic field is so large that the curvature radius of a particle can be disregarded, the function of this device is similar to that of the device provided for the biconical cusp magnetic field. In this arrangement, it is necessary that the magnetic flux extended from the cusp magnetic field is as parallel with the conical surface 155 as possible.

As is apparent from the above-described several examples, the reflector magnetic field generated by the device according to the invention acts effectively on the loss of particles from the line cusp of the cusp magnetic field and from the linear open ends of the mirror magnetic field, thereby to reduce the particle loss. However, since these examples are typical ones, the invention is not limited thereto or thereby.

In practice, in application of the reflector magnetic field, reduction of the particle loss is naturally limited. In the case where the line cusp is in endless form, it is possible to completely eliminate the particle loss in single particle trajectory analysis. However, in practice, the orbit becomes irregular at a certain probability due to the interaction of particles because a number of particles pass across each other. This probability is in proportion to the square of the particle density and is in inverse proportion to the square of the particle energy. Accordingly, in order to improve the effect of the reflector magnetic field, it is preferable to minimize the number of low energy particles which flows out of the line cusp and to keep empty the orbital space extended from the line cusp and affected by the external reflector magnetic field, and furthermore it is desirable that these methods are used in combination with other systems such as for instance a cusp-HF hybrid confinement system.

Thus, if, in the case where the particle loss at the open ends is of the sheet plasma in the plasma confining magnetic field of the open end system, the invention is applied to form the plasma confining device, the particle loss can be considerably reduced, whereby it is possible to approach the conditions necessary for generating and sustaining the thermonuclear reaction.

I claim:

1. A plasma confining device comprising:
   a plurality of cusp magnetic field means each for generating a cusp magnetic field confining a charged particle plasma, said cusp magnetic field having a line cusp portion, and some of said charged particles escaping through said line cusp portion forming a sheet-shaped charged particle flow substantially within a two-dimensional plane along said line cusp portion, and
   a deflection magnetic field means for generating a deflection magnetic field having a magnetic flux perpendicular to said plane, an edge of the deflection magnetic field being perpendicular to the direction of advancement of the escaping charged particles so that each of the escaping particles enters the deflection magnetic field, is deflected, leaves the magnetic field, and returns substantially within said plane, toward and through the line cusp portion into the inside of the plasma, wherein said deflection magnetic field means further includes neutralizing coils which generate a neutralizing field which will weaken said cusp magnetic field at said deflection magnetic field means, thereby reducing the radius of said deflection field means.

* * * * *